June 10, 1969 W. B. DELAMATER 3,448,772
WASTE PIPE PLUG
Filed April 18, 1966
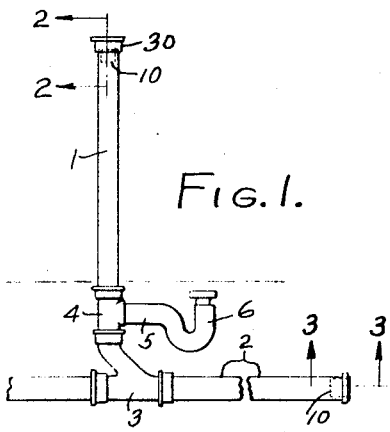
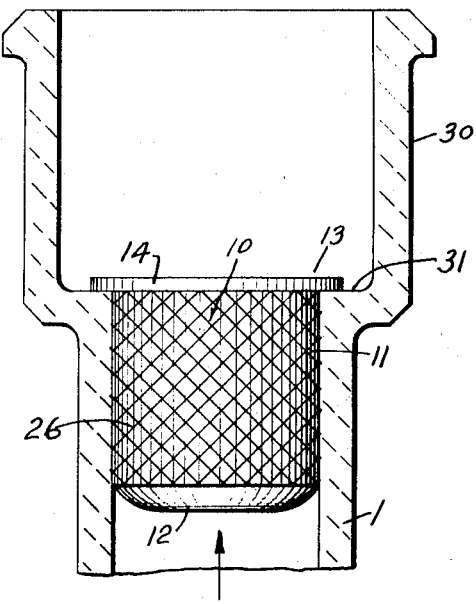
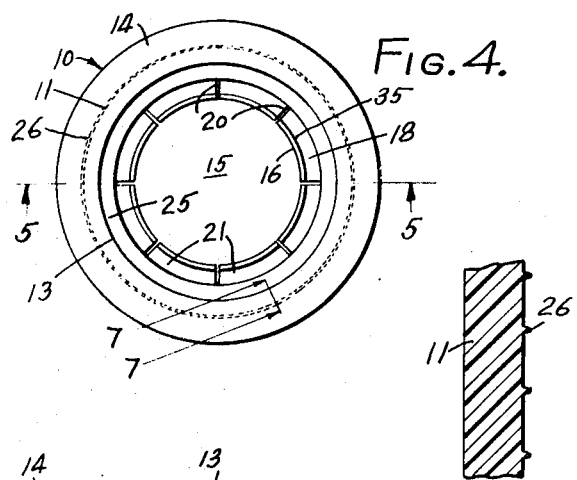
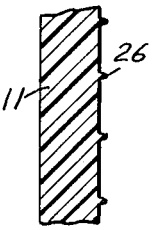
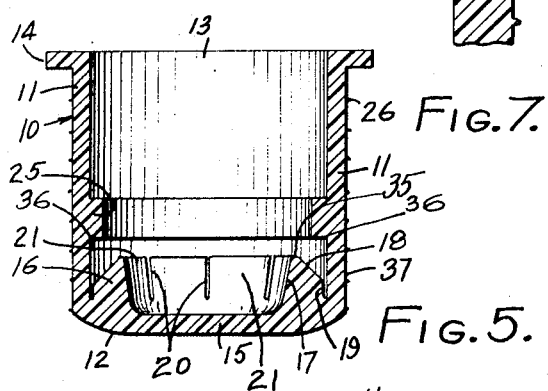
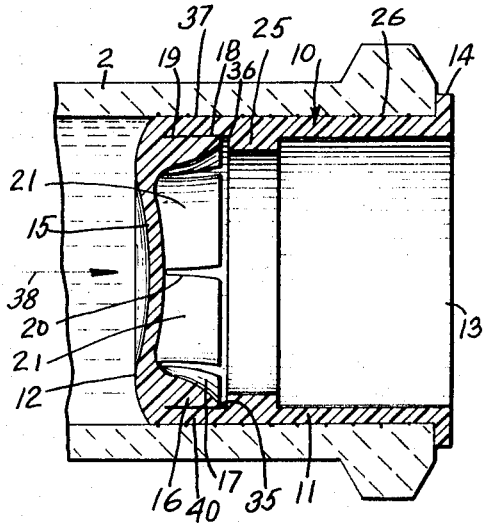
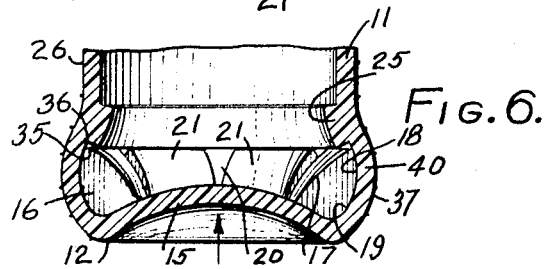
INVENTOR,
WILLIAM B. DELAMATER;
BY
ATTORNEY 3,448,772
WASTE PIPE PLUG
William B. Delamater, 9114 Valley View,
Whittier, Calif. 90603
Filed Apr. 18, 1966, Ser. No. 543,290
Int. Cl. F16l 55/10, 57/00; B65d 59/02
U.S. Cl. 138—89          3 Claims

ABSTRACT OF THE DISCLOSURE

The waste pipe plug is designed to be inserted in the open end of a pipe for the purpose of providing a positive leak proof seal to hold liquid within the pipe for testing of leak in a plumbing system. The plug, when inserted in the open end of a pipe, is automatically self-expanded by the liquid pressure within a system and does not require further attention other than the insertion in the pipe. The waste pipe plug includes a tubular body closed at one end by a diaphragm to which is internally and integrally attached a multi-split ring so situated as to expand or flow outwardly in response to external pressure against the diaphragm; an integral blocking ring is within the body situated above the multi-split ring to cause the split ring to be confined to an outward expansion and to maintain the expanded pressure in one uniform circle just below the blocking ring. As pressure externally builds up against the diaphragm, the blocking ring and split ring are so activated that the two oppose each other so that all lines of force are exerted in an outwardly uniform direction against the inside wall of the pipe.

---

The present invention relates to improvements in waste pipe plugs.

It has been the practice after a plumbing system has been installed within a building of some character, to test the system for liquid leakage. To accomplish this test, the open pipe ends are plugged to form a closed system, followed by filling the system with water. Any liquid leakage is observed at the pipe fittings and joints. Various and sundry means have been utilized for the purpose of the test for leakage such as the mixing of cement with casting plaster and water to form a paste which when placed in open pipe ends will harden and plug the open ends. This method of plugging waste pipe for test purposes is expensive and time consuming and requires a chipping of the plugs from the end of the pipes due to hardening thereof after a period of time which is usually thirty days, in order to install fixtures. Other means for plugging waste pipe in a test for leakage comprises the use of various types of plugs involving an assemblies of many parts, particularly when it is desirable to reuse the plug in other test locations. In the majority of cases plugs of this type are expensive to purchase.

An object of the present invention is to provide a waste pipe plug of simple construction and which provides an effective leak proof seal to hold liquid within a pipe.

A further object is the provision of a waste pipe plug which is self-sealing.

Another object is a waste pipe plug which is easily inserted by the hand within the open end of a waste pipe and which is automatically expanded to provide a seal by liquid pressure within the system being tested.

A further object is the provision of a waste pipe plug adapted to be expanded by pressure of liquid within the waste pipe under a uniform force.

Another object is the provision of a waste pipe plug for insertion within a waste pipe and which will seal the waste pipe without further attention after said insertion.

A further object is the provision of a waste pipe plug of inexpensive construction and which, after having served its purpose, may be thrown away.

Other objects and advantages will appear as the specification proceeds, among which advantages are ease of application for use, efficiency of operation and generally superior to plugs now known to the inventor.

With the above and other objects in view, the invention consists in the novel and useful provision, formation, construction, association and relative arrangement of parts, members and features, all as shown in a certain embodiment in the accompanying drawing, described generally and more particularly pointed out in the claims.

In the drawing:

FIGURE 1 illustrates pipes of a plumbing system using plugs of the present invention for the purpose of testing the plumbing system for liquid leak;

FIGURE 2 is a fragmentary cross sectional view on an enlarged scale, taken on the line 2—2 of FIGURE 1, with the plug installed within a pipe;

FIGURE 3 is a fragmentary sectional view on an enlarged scale, taken on the line 3—3 of FIGURE 1;

FIGURE 4 is a top plan view of the waste plug of the invention;

FIGURE 5 is a cross sectional view on the line 5—5 of FIGURE 4;

FIGURE 6 is a fragmentary cross sectional view showing a portion of the plug shown in FIGURE 5 in moved position; and, FIGURE 7 is a fragmentary enlarged sectional view on the line 7—7 of FIGURE 4.

Referring to the drawing and to FIGURE 1, a plumbing system is shown which includes a riser pipe 1 connected to a waste or soil pipe 2 by different type fittings. One riser pipe 1 is shown although it is evident that other riser pipes are contemplated for connection by fittings with the waste or soil pipe 2. A T joint 4 connects the riser pipe 1 with a Y fitting 3 and the T joint 4 is likewise connected to an arm 5 of trap 6. It is customary to test all of the riser pipes and fittings as well as the waste pipe for liquid leak prior to enclosing the pipes within a wall or under flooring. It is understood that the branches, risers and the like are connected to different fixtures such as a sink, a toilet, a lavatory, etc. As the testing for leak usually requires several days of time, it is essential that the waste or soil pipe 2 be closed and that the branches, likewise, be closed so that when water is placed in all of the pipes to fill the same, any leakage in the fittings, joints and branches can be readily found and corrected.

The plug 10 of the invention may be formed from various materials such as a plastisol which is a dispersion of a polyvinyl chloride resin in suitable liquid plasticizers. Other vinyl resins may be used, however, a plastisol has been found to be advantageous due to ease of molding with resultant desirable physical characteristics such as high tensile strength, low temperature flexibility, resistance to most acids, alkalyes, detergents and oils, and heat resistance over long periods of time. The low cost of the vinyl polymer lends itself to the manufacture of the plug of the present invention as the plug may be thrown away after use rather than preserving the plug for future use.

The plug 10 has a tubular wall 11 closed at one end 12 and open at the opposite end 13. The wall at the open end 13 of the plug is provided with an external flange 14 while the end 12 is closed by a diaphragm 15. The diaphragm 15 is flexible in nature so that external pressure thereagainst will move the same inwardly of the tubular wall illustrated in FIGURES 3 and 6. A ring or annulus 16 has its base integrally formed with the diaphragm and lies adjacent the interior of the tubular wall 11. The annulus 16 is of enlarged section relative to the thickness of the side wall or the thickness of the diaphragm of the plug. A cross section of the annulus 16, as shown in FIGURE 5, when the annulus is not under pressure, is substantially a polygon of four sides 17, 18 and 19, the fourth side forming the quadrilateral being the diaphragm 15. It will be noted that the side 17 of the annulus is at an angle to the axis of the tubular wall 11 while the side 19 is separated in part from the interior of the tubular wall 11 terminating adjacent the diaphragm. The side 18 which joins sides 17 and 19 slopes downwardly toward the tubular wall 11 being at an acute angle to side 17 and at an obtuse angle to side 19. The annulus 16 is provided with a series of spaced longitudinal slits 20 to divide the annulus into equal sections designated as 21.

Immediately above the annulus 16 and formed on the inner surface of the tubular wall, is a blocking ring or annulus 25. The ring or annulus 25 is substantially rectangular in cross section and is integrally formed with the tubular wall 11 of the plug.

The external surface of the tubular wall 11 carries a raised design 26 which, in the present instance, is diamond shaped to provide for frictional engagement with a soil pipe or other pipe when the plug is in use.

The operation, uses and advantages of my invention are as follows.

The riser pipe 1 has a hub end 30. The plug 10 is placed within the riser pipe so that the flange 14 engages annular ledge 31 to limit downward travel of the plug. The body diameter of the plug will be formed to be accommodated within the internal diameter of the soil pipe. After a sufficient number of plugs have been inserted by hand within open ends of riser and soil pipes, the system is filled with water to determine any leakage of various fittings joining the different pipes. Water pressure against the diaphragm 15 will cause the diaphragm to move inwardly of the tubular wall 11 as shown in FIGURES 3 and 6 from the position of FIGURE 5 so that the diaphragm assumes a concave form. The diaphragm communicates such concavo-convex deformation to the ring or annulus 16 and moves the same outwardly so that the oblique side 18 moves to position the angular or apex portion 35 under the ring or annulus 25 and particularly the angular portion 36 between said annulus 25 and the interior side wall of the body, as shown in FIGURE 3. At this time the wall 18 engages the interior wall of the body as shown in FIGURE 3. If the plug was not within a pipe, as shown in FIGURES 2 and 3, but had the diaphragm pushed inwardly as shown in FIGURE 6, movement of the ring or annulus 16 inwardly by moving the diaphrgam inwardly of the plug to assume a concavo-convex form as shown in FIGURE 6 would force the side wall 37 of the plug positioned between the blocking ring 25 and the diaphragm outwardly to assume an external convex form. Such diaphragm movement would cause a separation of the various sections 21 of annulus 16 due to the slits 20 and as shown in FIGURE 6. However, as the plug is confined within a pipe as shown in either FIGURE 2 or 3 and dependent upon whether or not a hub end type of pipe or a spigot type pipe was utilized as shown in FIGURE 3 liquid pressure in the direction of the arrow 38 in FIGURE 3 would force the diaphragm inwardly and flaring outwardly of the sections of the ring or annulus into engagement with the side wall of the plug below the blocking ring 25 so that the higher liquid pressure against the diaphragm in the direction of the arrow 38 would force portion 37 of the side wall of the plug against the interior of the pipe under a pressure proportioned to liquid pressure against the diaphragm.

The present plug is self-sealing within a pipe and is limited as to its inward movement by the flange 14. Hence, the user of the plug is not required to make any adjustments other than the insertion of the plug within the pipe to a depth within the pipe abutting the flange. The plug is then automatically expanded by liquid pressure against the diaphragm 15. The split ring is then tipped or flared outwardly due to the split sections and this tipping motion expands the side wall 11 between the blocking ring 25 and the diaphragm at 37 due to flexibility of the side wall. It may be noted that the plug material is flexible. Flexibility of the wall causes the wall to expand outwardly as shown in FIGURE 6 without allowing the side wall to elongate appreciably. A Shore harness of A–52 has been found to give the plug desirable operable characteristics.

Movement of the diaphragm inwardly under pressure to concave the diaphragm and form an inner convex surface tips the multiple split ring sections 21 outwardly for engagement with the side wall of the plug between the diaphragm and that portion of the side wall of the plug between the ring 25 and the diaphragm particularly at the marginal portion thereof. In the tipping of the split ring, the slanting surface 18 moves into engagement with the inner wall of the plug at 40 and the apex between the slanting wall 18 and wall 17 at 35 engages the corner between the bottom of ring 25 and wall 40. As the portion containing wall 40 is flexible, the longitudinal height between ring 25 and the diaphragm is reduced from the position of FIGURE 5 to that of FIGURE 6 and this reduction arcuately expands the side wall as shown at 3.

I claim:

1. A waste pipe plug, including: a flexible tubular body open at one end, and a diaphragm closing the opposite end thereof, a ring within the body adjacent the tubular body and integrally formed with the diaphragm, said ring provided with a series of spaced longitudinal slits to provide sections and whereby pressure directed against the exterior surface of the diaphragm automatically tilts the split ring sections outwardly against the tubular body to deform said tubular body adjacent the diaphragm into concavo-convex form.

2. A waste pipe plug for limited insertion in the open end of a waste pipe, including: a tubular body formed of flexible material and open at one end, a flexible diaphragm closing the opposite end of the tubular body, a multi-longitudinally split ring within the tubular body and secured to the diaphragm the split ring lying adjacent the interior of the tubular body and a cross section of said split ring being substantially a polygon providing an inner side at an acute angle to the plane of the diaphragm and a side sloping downwardly at an obtuse angle to the plane of the diaphragm, external pressure exerted centrally of the diaphragm automatically tipping the ring into engagement with the tubular body in the zone of the split ring to expand the tubular body into a concavo-convex outwardly form.

3. The device as set forth in claim 2, and a ring formed on the interior of the tubular body above the split ring for engagement with the split ring to maintain the split ring in pressure engagement with the tubular body when the tubular body is expanded into concavo-convex form.

References Cited
UNITED STATES PATENTS

| 2,487,635 | 11/1949 | Carpenter | 4—295 |
| 2,968,047 | 1/1961 | Stilborn | 4—295 |
| 2,974,685 | 3/1961 | Ver Nooy | 138—90 |
| 3,156,373 | 11/1964 | Willis | 138—89 XR |
| 3,200,984 | 8/1965 | Fueslein et al. | 138—89 XR |
| 3,291,156 | 12/1966 | Corsano | 138—89 |

FOREIGN PATENTS 536,228 11/1955 Italy.

LAVERNE D. GEIGER, *Primary Examiner.*

H. K. ARTIS, *Assistant Examiner.*

U.S. Cl. X.R.

4—295; 138—96